(No Model.)
E. SAVILL.
AIR PUMP.
No. 513,535. Patented Jan. 30, 1894.
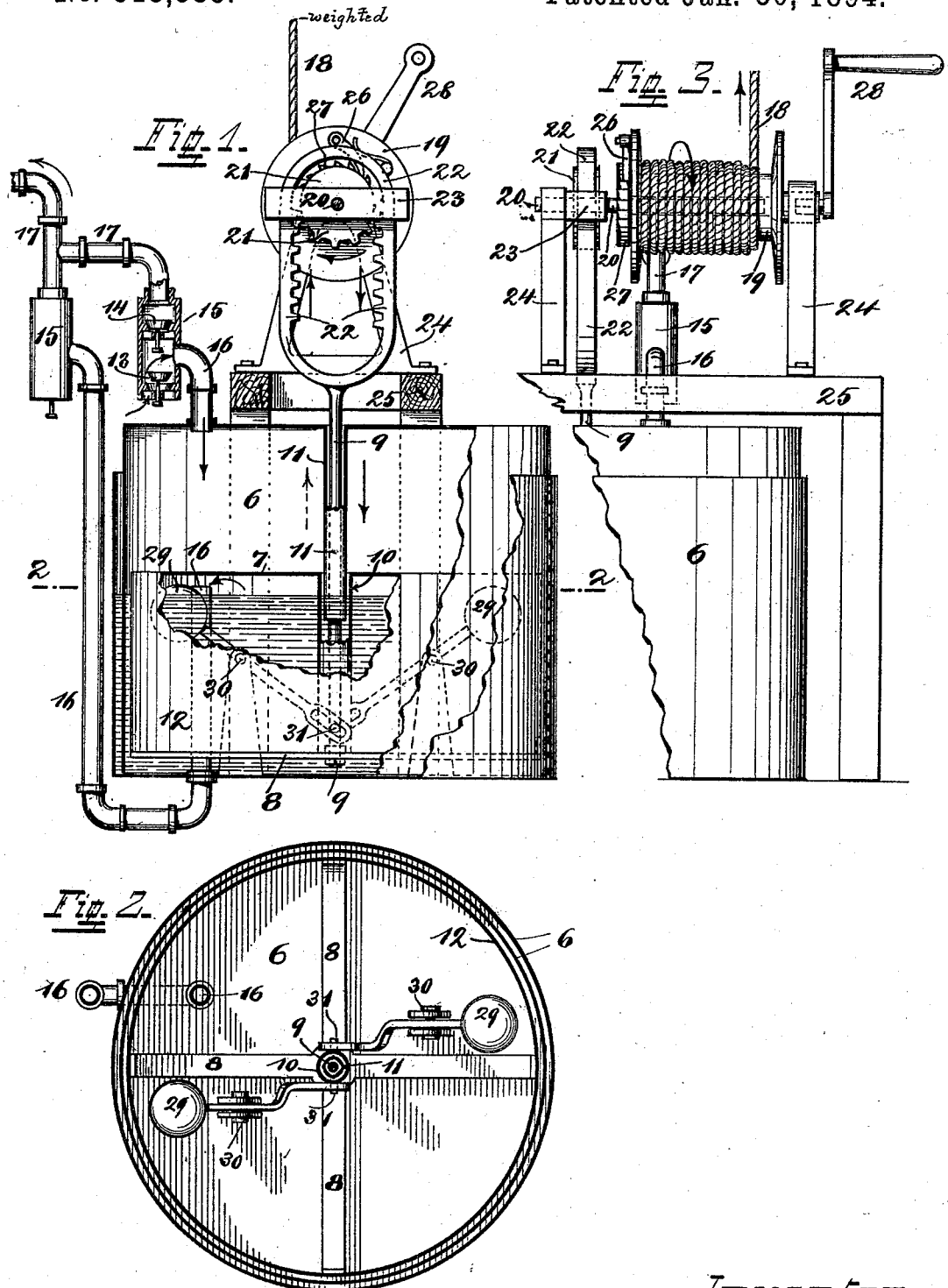
Inventor
Edward Savill
by Chas. Spengel Atty.
Attest:
A. C. T. Peirce
Chas. Mitchell

UNITED STATES PATENT OFFICE.

EDWARD SAVILL, OF LEXINGTON, KENTUCKY, ASSIGNOR OF TWO-THIRDS TO JOHN W. NEWMAN AND JAMES C. OLIVER, OF SAME PLACE.

AIR-PUMP.

SPECIFICATION forming part of Letters Patent No. 513,535, dated January 30, 1894.

Application filed December 12, 1892. Serial No. 454,902. (No model.)

*To all whom it may concern:*

Be it known that I, EDWARD SAVILL, a citizen of the United States, residing at Lexington, in the county of Fayette and State of Kentucky, have invented certain new and useful Improvements in Air-Pumps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to air-pumps and is principally intended to be used in the manufacture of illuminating gas by so-called gas-machines and especially in those where a volatile and vaporizable liquid or oil forms the gas-producing agent. It may be used in connection with a carburetor such as described in my pending application filed December 12, 1892, Serial No. 454,901, or in connection with any other suitable gas-generator. In such connection these pumps are used to furnish the air necessary to induce and maintain the vaporization of the oil, to dilute the generated vapor and to furnish the requisite pressure to carry the gas to the place of its consumption, respectively to the burners.

The novel features of this pump are its simple construction and the means employed to keep it airtight without the use of packing and stuffing boxes, whereby most of the friction to which the reciprocating parts are subject, is avoided and by which reason the power required to run the pump is greatly reduced and its operation and maintenance rendered extremely simple and inexpensive.

In the following specification and particularly pointed out at the end thereof, is found a full description of my invention, its parts, operation and construction, which latter is also illustrated in the accompanying drawings, in which—

Figure 1, is a side-elevation of my pump, partly in section and parts of it broken away. Fig. 2, is a horizontal section on line 2—2, of Fig. 1; and Fig. 3, is an elevation at right angles to Fig. 1, of the top part of the pump.

6, is the pump-cylinder, constructed in the simplest manner out of two cylindrical bodies or vessels, open at one of their ends and one of which, its open end first, is inserted loosely within the other.

7, is the piston, being also a cylindrical vessel, open at one end and of somewhat smaller diameter and of less height than the smaller one of the two telescoped vessels first mentioned. Its open end is underneath and provided thereat with a spider 8, to which the piston-rod 9, connects.

10, is a cylindrical partition, surrounding the piston-rod and preferably as high as the piston of which it forms a part. 11, is a similar partition, but of smaller diameter, also surrounding the piston-rod, beginning where the latter passes out from the pump-cylinder and reaching down to within partition 10. The lower part of the pump-cylinder is filled with water, or any other suitable liquid, the top-surface of which reaches to the piston-head 7, when it is in its lowest position. Fig. 1, shows this construction very plainly. It will be observed that by reason of the vertical part 12, of the piston 7, the lower edge of which part, during the up-and down-movements of the piston never rises above the top of the liquid and by reason of partition 10, no air can pass from one side of the piston-head to the other. Partition 11, which passes also into the water, takes the place of a stuffing-box, at the point where piston-rod 9, passes in and out of the pump-cylinder and prevents the escape of air from the latter. This liquid surface which forms one of the heads of the pump-cylinder makes it unnecessary that the parts should fit tightly, like for instance the piston fitting within the pump-cylinder, or the two sections or vessels forming the body of the pump; yet nevertheless it provides for perfectly air-tight joints wherever they are needed. This absence of all tight-fitting joints, stuffing-boxes, packing, &c., prevents the friction otherwise present, thereby greatly lessening the power required to operate the pump and permits the same to be constructed in a simple manner and at a low manufacturing-cost. The most essential point is that the liquid-head or water-level be maintained constantly at the same height, which is very easily accomplished by pouring from time to time water in through the space between the two parts or sections of the pump-body, or through any other opening provided for this purpose.

As will be observed the pump is a double-acting one, for which purpose it is provided with two induction valves 13, 13, and two exhaust valves 14, 14, which are divided into two sets arranged within two valve-chambers 15, each of which contains a valve of each kind.

Pipes or passages 16, connect the valve-chambers with the pump-cylinder, entering the latter to each side of the piston. One of the pipes entering below piston 7, must be carried up above the permanent water-head, to prevent the water from escaping, or from filling said pipe. The induction-valve of one set, or chamber acts always with the exhaust-valve of the other set during each stroke of the piston, so that the pump-cylinder simultaneously exhausts on one side of the piston and fills with air on the other side. Reference to Fig. 1, shows this plainly, piston 7, having nearly completed its down-stroke and expelled most of the air between it and the liquid-head, while the pump-cylinder above it is filling through the open induction-valve 13. The position of the valves (not visible) in the other valve-chamber 15, is reversed, the induction-valve being closed, while the exhaust-valve is open. In this manner a continuous flow of compressed air through pipes 17, to the gas-generator takes place, whereby an even pressure is maintained in the latter and flickering of the lights at the burners prevented.

The reciprocatory movement of the piston may be attained in any suitable manner, but under due consideration of the objects and purposes of this pump, it should be obtained in a manner which requires little attention, starts and stops automatically and adjusts its speed in direct proportion to the quantity of air needed by the generator and drawn by it from the pump. Such a movement is obtained by a weight, on a rope 18, acting upon a drum 19, on a shaft 20, carrying a mutilated cog-wheel 21, which engages with a double-rack 22, secured to the upper end of piston-rod 9. Continuous revolution of this cog-wheel causes its toothed part to engage alternately first with the rack-teeth on one side and then with the teeth on the other, whereby the double-rack with the piston-rod and piston attached, is caused to assume the reciprocatory motion necessary for the operation of the pump. During such motion the rack is held straight by a guide 23, passing around it and secured to one of the bearings 24, supporting shaft 20. These bearings 24, may rest upon a suitable frame-structure 25.

To facilitate the convenient winding of the rope upon the drum, the latter is loose on shaft 20, but for operative purposes it is connected with the same by means of pawl 26, engaging with a ratchet-wheel 27, fast on shaft 20.

28, is a crank on which drum 19, may be wound.

29, are weights secured to levers which are pivoted at 30, and with their other free ends connected to the piston at any suitable point 31 forming a part thereof. These weights serve to counteract the dead-weight of the piston and its accessory parts during the up-stroke of the same.

Having described my invention, I claim as new—

1. In an air-pump, the combination of a pump-cylinder, a piston inside of it, means to reciprocate the same, a permanent liquid-body forming one of the surfaces between which the air is compressed, circular partitions 10, and 11 surrounding the piston-rod having their lower ends water-sealed induction and exhaust valves and passages connecting them with the spaces to either side of the piston, all as substantially shown and described.

2. In an air-pump, the combination of a pump-cylinder, a piston inside of it, means to reciprocate the same, a piston-rod connecting the piston to these means, a liquid-body forming one of the surfaces between which the air is compressed, a circular partition 11, taking the place of a stuffing-box, surrounding the piston-rod, beginning where the latter passes out from the pump-body and extending with its lower edge below the level of the liquid-head, induction and exhaust valves and passages connecting them with the spaces to either side of the piston, all substantially as shown and described.

3. In an air-pump, the combination of a pump-cylinder, consisting substantially of two vessels each open at one end, and one, its open end first, inserted within the other, a reciprocating piston within this pump cylinder, a liquid body contained in the pump-cylinder and reaching above the lower edge of the inserted vessel forming part of the pump-body, passages, one entering each vessel composing the pump-body and entering this latter to each side of the piston, induction and exhaust valves for each passage and a pipe 17, communicating with each set of valves all substantially as shown and described.

In testimony whereof I affix my signature in presence of two witnesses.

EDWARD SAVILL.

Witnesses:
 A. McCONNELL,
 GEORGE J. WARREN.